United States Patent [19]
Miekka et al.

[11] Patent Number: 5,956,896
[45] Date of Patent: Sep. 28, 1999

[54] METHODS AND APPARATUS FOR REDUCING CARBON 14 IN LIVING TISSUE

[76] Inventors: Fred N. Miekka, 234 San Gabriel Ct.; Peter William Mackie, 276 Grandview Ave., both of Sierra Madre, Calif. 91024

[21] Appl. No.: 08/900,154

[22] Filed: Jul. 28, 1997

Related U.S. Application Data

[60] Provisional application No. 60/035,629, Jan. 16, 1997.

[51] Int. Cl.$^6$ ..................................................... A01G 7/02
[52] U.S. Cl. .................................................................. 47/58
[58] Field of Search ........................... 47/58, 58.1, 59, 47/60, 1.4, 17

[56] References Cited

U.S. PATENT DOCUMENTS

| | | | |
|---|---|---|---|
| 3,854,240 | 12/1974 | Oldham et al. | 47/1.4 |
| 4,162,298 | 7/1979 | Holladay et al. | 423/230 |
| 5,471,785 | 12/1995 | Mathews | 47/58 |

*Primary Examiner*—Jack W. Lavinder
*Assistant Examiner*—Yvonne R. Abbott
*Attorney, Agent, or Firm*—Eric K. Satermo

[57] ABSTRACT

A method is provided for growing plants in an environment having air containing carbon dioxide which is lower in carbon 14 content than under normal ambient conditions. Such plants grown under these conditions have a lower concentration of carbon 14 and therefore their natural radioactivity will be reduced. The process involves controlling of the source of carbon dioxide used by the plants as one derived from carbon compounds of very low carbon 14 content. Such sources include but are not limited to limestone and fossil fuels. Such plant material can be used to make articles traceable to the process, or alternatively certain plants can be grown for human or animal consumption to reduce the overall radioactive body burden of carbon 14.

18 Claims, 4 Drawing Sheets

1

METHODS AND APPARATUS FOR REDUCING CARBON 14 IN LIVING TISSUE

This application claims benefit of provisional application 60/035,629, filed Jan. 16, 1997.

FIELD OF THE INVENTION

The present invention relates to methods and apparatus for controlling an environment for growing plants. More particularly, the present invention relates to methods and apparatus for supplying carbon dioxide with low carbon 14 content to a greenhouse in which plants are grown.

BACKGROUND OF THE INVENTION

Natural carbon dioxide in the air contains a small percentage of molecules containing radioactive carbon 14. All plants derive their carbon compounds from ambient carbon dioxide in the air. All animals including humans derive their carbon compounds directly or indirectly from plants: directly by consuming vegetable matter, and indirectly by consuming animal products such as meat, milk products and eggs.

This results in a certain percentage of carbon atoms in all living tissue being that of radioactive carbon 14. When the living organism dies, no more new carbon 14 is absorbed. The existing carbon 14 then decays away with an approximate half-life of 5,730 years. This means that for every 5,730 years that dead plant or animal matter or products derived from plant or animal matter age, their natural radioactivity due to carbon 14 is reduced by half. This process of natural carbon 14 decay is the basis of a method for determining the age of dead plant or animal tissue or products derived thereof. This method for determining the age of once living tissue is well known as "Carbon 14 Dating".

The initial concentration of carbon 14 in the carbon atoms that make up the carbon dioxide of the air comes from the interaction of high energy ionizing radiation from the sun or in the upper gaseous layers of the earth. Therefore, carbon 14 based carbon dioxide is always being naturally produced. Plants grown under ambient conditions contain a considerable amount of radioactivity. Animals including humans which consume these plants are also radioactive due to the carbon 14 absorbed. Carbon 14 is a beta particle emitter which, after emitting harmful beta radiation internally within the organism, changes to nitrogen 14 which is stable. This is particularly troublesome for carbon 14 within our strands of DNA. Not only does the opportunity exist for damage from beta particles and recoiling nitrogen 14 atoms resulting from this decay, but also the valence state of the carbon 14 atom has changed. Instead of being the valence for carbon which is +4 or −4, it is now changed to that of nitrogen which is +5 or −3. Even if the beta particle emitted cleanly travels out of the body without incident and the recoil of the resulting nitrogen 14 atom does not break any bonds, this change in valence number causes further damage.

SUMMARY OF THE INVENTION

It is a object of this invention to provide a controlled environment which is suitable for growing plants and which contains at least some carbon dioxide which has a lower carbon 14 content than that normally found under ambient conditions.

It is a further object of this invention to grow plants suitable for human and animal consumption having a reduced carbon 14 content.

It is a further object of this invention to provide plant and animal products suitable for the manufacture of articles having a reduced carbon 14 content.

It is a further object of this invention to provide food which is low in carbon 14 content in order to reduce the burden of radiation to the body by the reduction of carbon 14.

This invention, therefore, proposes removing ambient carbon dioxide from the air by absorption. Accordingly, carbon dioxide low in carbon 14 is produced, and this modified air is used to grow plants substantially free from carbon 14. These plants can be used to make articles such as low carbon 14 paper for anti-counterfeit documents, or alternatively, edible plants can be grown and used to reduce the carbon 14 content of the diet. Carbon 14 reduced plant matter can also be fed to animals to produce other food products such as milk, eggs, and meat which is low in carbon 14.

According to one aspect of the invention, a method for growing plants having a low carbon 14 content includes the initial step of removing carbon dioxide from an air supply. Carbon dioxide is then produced which is lower in carbon 14 concentration than the removed carbon dioxide. This produced carbon dioxide is then added to the air supply which is introduced into the greenhouse. Accordingly, plants may then be grown in the greenhouse without carbon 14-containing carbon dioxide.

According to another aspect of the invention, a method for growing plants having a low carbon 14 content includes the step of removing carbon dioxide from a greenhouse. Carbon dioxide is then produce which is lower in carbon 14 concentration than the removed carbon dioxide. The produced carbon dioxide to is then added to a water supply which is then introduced into the greenhouse.

Other objects and aspects of the invention will become apparent to those in the art from a reading of the following detailed description with reference to the accompanying drawings.

DETAILED DESCRIPTION OF PREFERRED EMBODIMENTS

Figure 1:
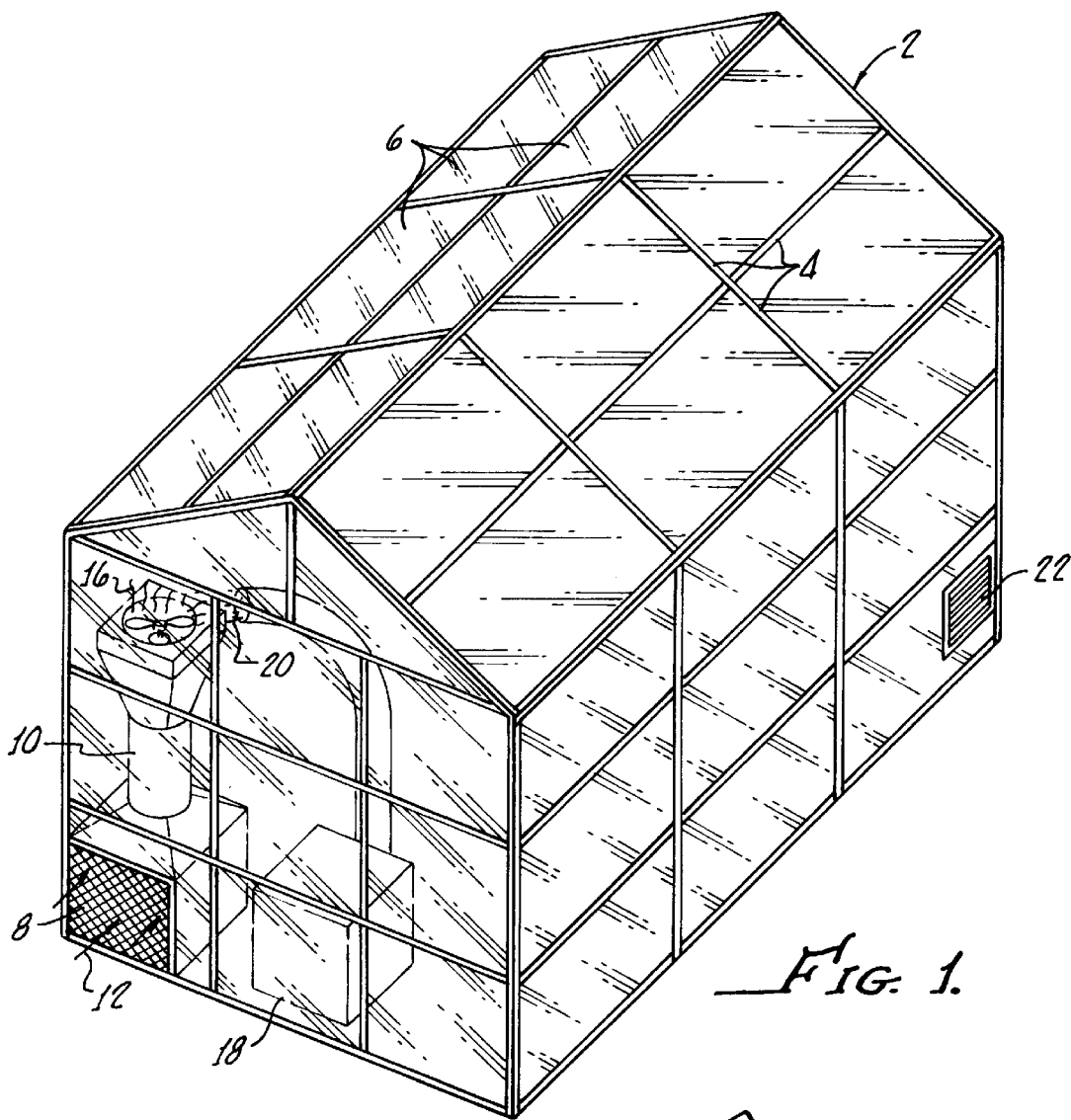
FIG. 1 is a perspective view of a greenhouse according to the present invention for which the internal environment is supplied with air having carbon dioxide with a low carbon 14 content.

FIG. 1 illustrates a greenhouse 2 which includes of a frame 4 and panels 6 which let in sunlight. The carbon dioxide in the ambient air in greenhouse 2 is reduced or depleted to a relatively low level. This low level may be about 50% of normal levels. More preferably, the carbon dioxide is reduced by at least 75% or up to 100%. Also shown is an air intake assembly 8 with a carbon dioxide removal canister 10. Outside air 12 is sucked into carbon dioxide removal canister 10 through air intake assembly 8 by fan 14. Carbon dioxide depleted air 16 is then passed by carbon dioxide generator 18 which generates carbon dioxide which is virtually free from radioactive carbon. This carbon dioxide 20 which is virtually free from radioactive carbon is then added to the stream of carbon dioxide depleted air 16 and enters into the air supply of greenhouse 2. Small slits 22 on the opposite side of greenhouse 2 provide an exit for relieving some of the positive internal pressure generated by fan 14. Greenhouse 2 may maintain a slight positive pressure and may be substantially hermetically sealed with the exception of small vent slits 22.

Figure 2:
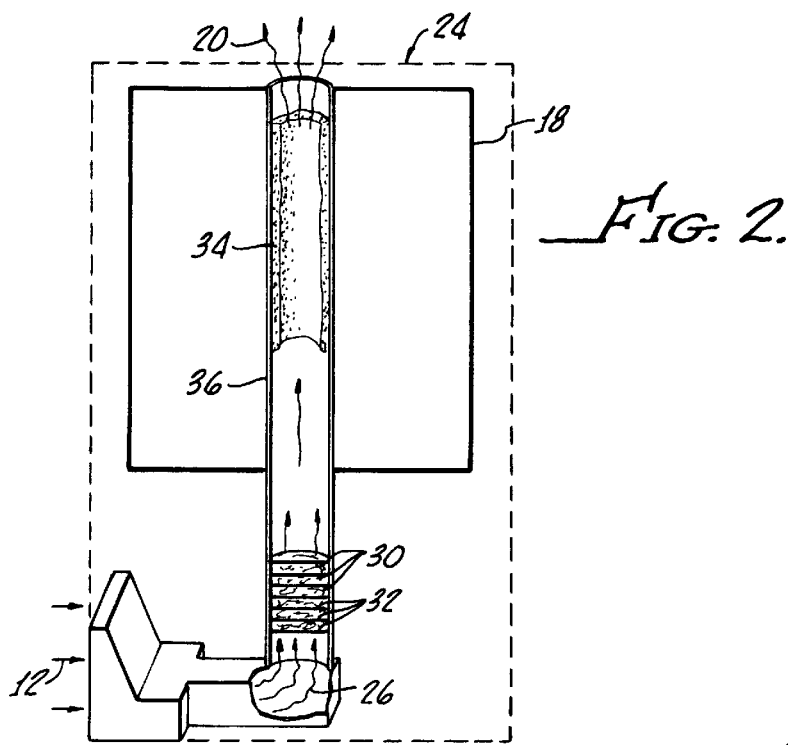
FIG. 2 is a schematic view of a system for first absorbing ambient carbon dioxide normally present in the air, and then introducing carbon 14 reduced carbon dioxide back into the air for use inside the greenhouse, in accordance with the present invention.

FIG. 2 shows a system 24 for first absorbing ambient carbon dioxide 26, then producing carbon dioxide 20 which is substantially free from radioactive carbon, and finally introducing this new air 28 into the inside of greenhouse 2 (not shown). In this system outside air 12 is made to pass through carbon dioxide absorbent 30 which could be any material capable of removing carbon dioxide from ambient air stream 12. Such materials include alkali metal hydroxides and carbonates, alkaline earth hydroxides, or any other material capable of carbon dioxide removal.

Carbon dioxide generator 18 is used to generate non-radioactive carbon dioxide 20 from limestone 34 by thermal decomposition. High-temperature furnace 36 is used to heat limestone 34 to its decomposition temperature, thus generating carbon dioxide 20 which is virtually free from radioactive carbon. Non-radioactive carbon dioxide 20 is then introduced into the ambient air of greenhouse 2.

One particularly interesting approach is to use waste stream calcium oxide from the thermal decomposition of limestone previously used to produce non-radioactive carbon dioxide 20. In this way, limestone having virtually no radioactive carbon is brought in, and limestone having the normal concentration of radioactive carbon found in ambient carbon dioxide is removed. This waste limestone 32 is still a commercially valuable material.

Figure 3:
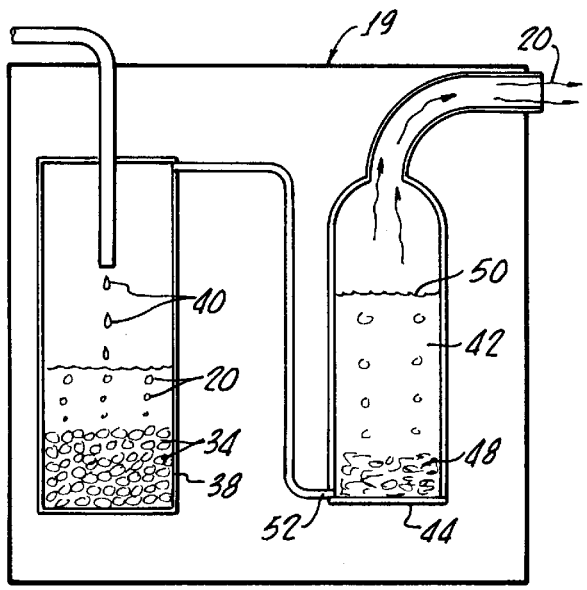
FIG. 3 is a schematic view of a carbon 14 reduced carbon dioxide generator utilizing an electric furnace to decompose limestone or other carbonates containing carbon having a low concentration of carbon 14.

FIG. 3 shows a carbon dioxide generator 19 which produces carbon dioxide 20 which is substantially free from radioactive carbon. This generator consists of an acid resistant canister 38 which is filled with limestone 34 which is relatively free from radioactive carbon. When carbon dioxide is needed, a suitable acid 40 such as hydrochloric acid is introduced into canister 38. The acid reacts with the limestone to release carbon dioxide 20 which is substantially free from radioactive carbon. The carbon dioxide 20 thus produced is then cleaned of any residual acid fumes by bubbling through cleaning column 42. Cleaning column 42 consists of an outer canister 44 which is made from an acid resistant material such as polyethylene. The inside of this column is filled with limestone chips 48 which are submerged in a layer of water 50. Inlet port 52 is connected to the output of carbon dioxide generator 38 and is located at the bottom of cleaning column 42. At the top of cleaning column 42 is the exit to the air in greenhouse 2.

Figure 4:
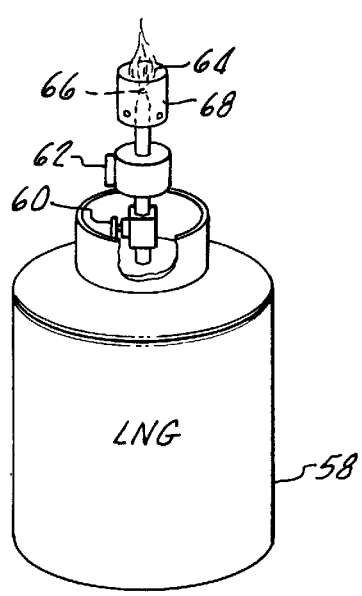
FIG. 4 illustrates a carbon 14 reduced carbon dioxide generator of the invention utilizing the combustion of fossil fuels as a source for producing carbon dioxide which is substantially free from carbon 14.

FIG. 4 shows a carbon dioxide generator 56 that uses the combustion of petroleum products to generate carbon dioxide that is virtually free from radioactive carbon. Pressurized liquified natural gas tank 58 is filled with liquified natural gas which by virtue of it being a fossil fuel contains almost no radioactive carbon atoms. A valve 60 allows vaporized gas to flow into a pressure regulator 62 which regulates the pressure to a usable value for combustion chamber 64. Combustion chamber 64 consists of a nozzle 66 and an air regulating ventri tube 68. When more radioactive carbon reduced carbon dioxide is needed, valve 60 is opened and natural gas escaping from nozzle 66 is ignited with a spark or other suitable source of ignition. This initiates the burning of the natural gas, thus producing carbon dioxide which is virtually free from radioactive carbon, and of course, water.

Figure 5:
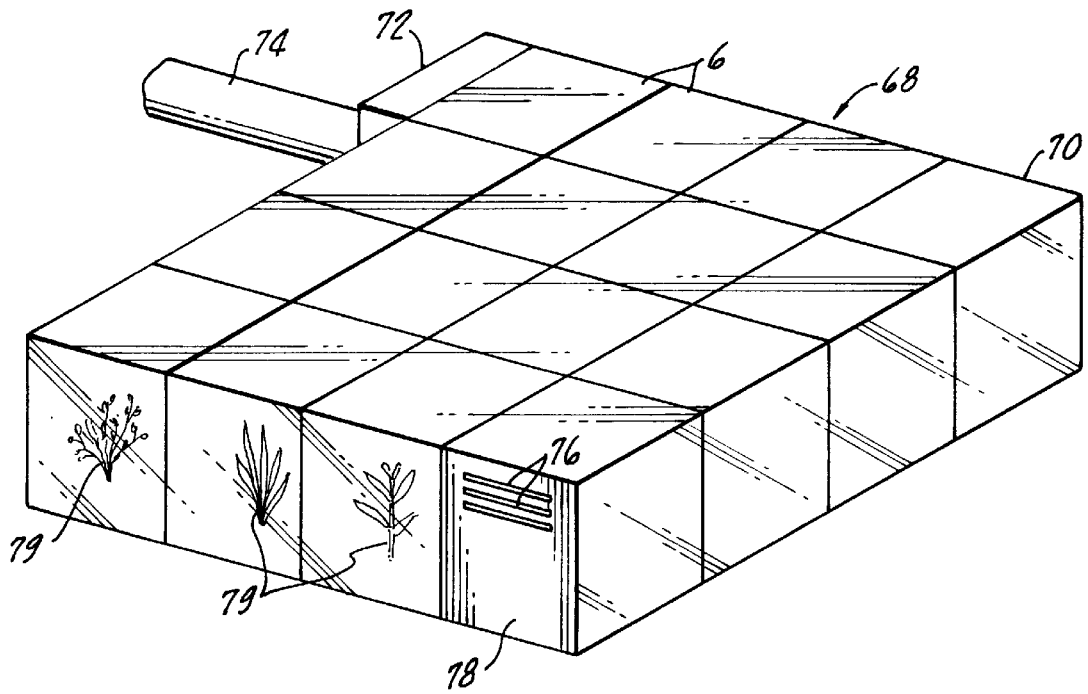
FIG. 5 is a perspective view of a low profile greenhouse according to the invention which provides a large surface area for growing large numbers of plants containing a reduced quantity of carbon 14 at a lower cost than provided by a conventional greenhouse.

FIG. 5 shows a low profile greenhouse 68 consisting of a low profile frame 70 and panels 6 which let in sunlight. Also included is an intake manifold 72 which is used to introduce air containing carbon dioxide which has a reduced radioactive carbon content. Positive pressure in introduction pipe 74 pushes this modified air into the greenhouse and creates a slight positive pressure within this greenhouse to exclude ambient air. Slits 76 in exhaust panel 78 provide an exit for relieving positive pressure build up and allows the incoming air stream from pipe 74 to continuously flush the system. Plants 76 absorb the carbon dioxide having a reduced concentration of radioactive carbon from the air stream which is introduced into the low profile greenhouse from introduction manifold 72. This incorporates the carbon atoms which are virtually free from radioactivity into the structure of their cells, thus producing plant matter having a reduced radioactive carbon concentration as compared to plants grown under ambient conditions.

Figure 6:
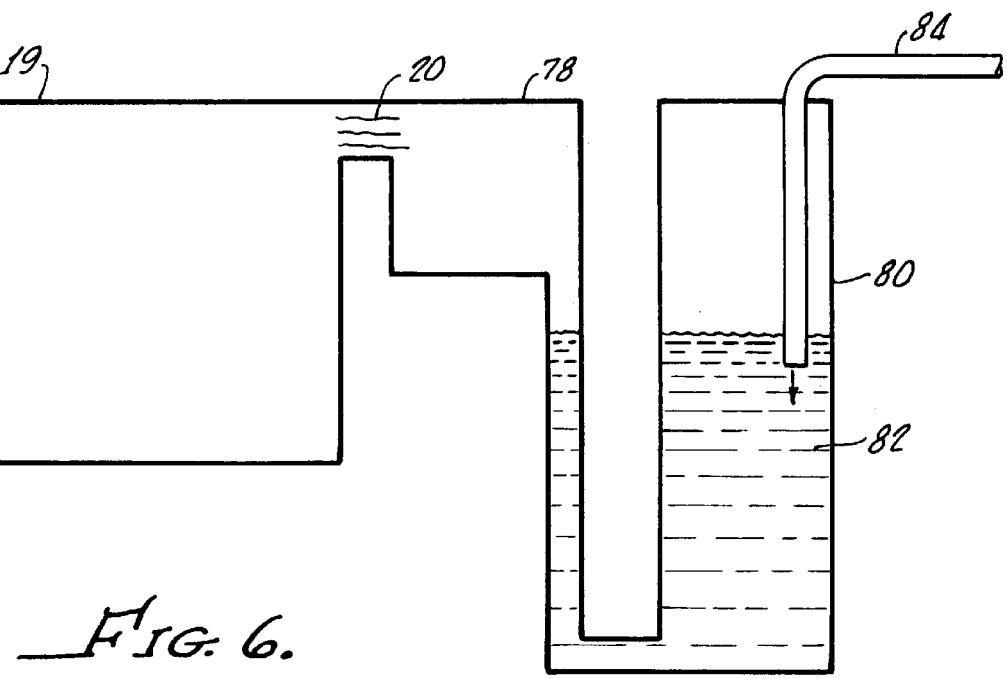
FIG. 6 is a schematic view of an apparatus for indirectly introducing carbon dioxide which is substantially free from carbon 14 into the plants by effervescence from carbon dioxide saturated water, according to the invention.

FIG. 6 shows an apparatus for indirectly introducing carbon dioxide having a reduced concentration of radioactive carbon. Carbon dioxide generator 19 produces carbon dioxide 20 which is substantially free from radioactive carbon. Compressor 78 compresses this carbon dioxide to a high pressure and inputs it at this elevated pressure into a reservoir 80 which contains cold water 82. Cold water 82 absorbs this high pressure carbon dioxide, thus forming carbonated water 84 which is substantially free from radioactive carbon. Carbonated water 84 can then be pumped into the greenhouse (not shown) which, upon warming, water evaporation releases carbon dioxide 20 which is substantially free from radioactive carbon for absorption by plants (not shown).

Figure 7:
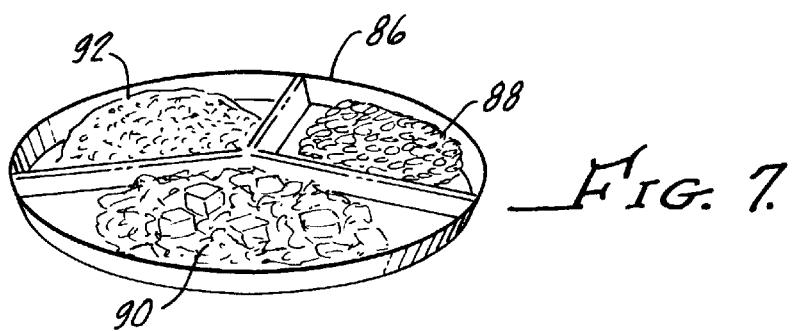
FIG. 7 illustrates examples of food prepared from vegetables grown under air containing carbon dioxide which is substantially free from carbon 14 in accordance with the present invention.

FIG. 7 shows prepared food from vegetables that were grown under air containing carbon dioxide which is substantially free from radioactive carbon. On plate 86 are baked beans 88, tofu salad 90, and rice 92 all of which have a reduced radioactive carbon content.

Figure 8:
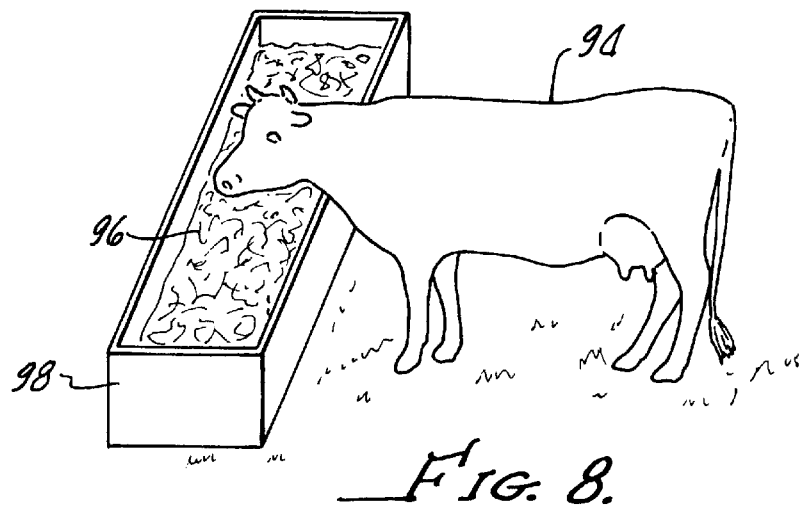
FIG. 8 illustrates farm animals feeding on plants which are virtually free from carbon 14 according to the invention.

FIG. 8 shows a cow 94 feeding on alfalfa 96 that was grown under the conditions of radioactive carbon reduced carbon dioxide laden air. Feed box 98 holds alfalfa 96.

Figure 9:
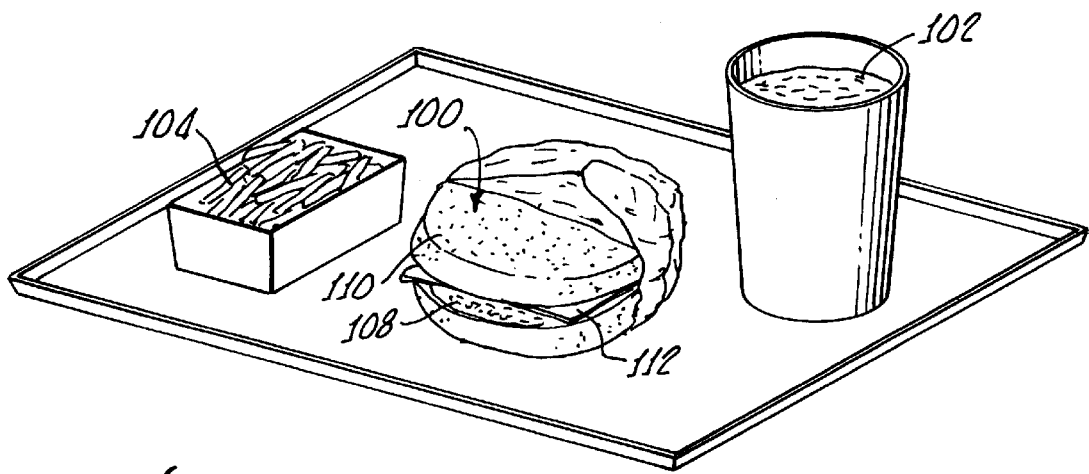
FIG. 9 illustrates a complete meal prepared from food which is virtually free from carbon 14 according to the invention.

FIG. 9 shows a complete tasty radioactive carbon reduced meal consisting of a cheeseburger 100, a glass of milk 102, and french fries 104. Glass 106 holds milk 102 which came from a cow (not shown) that was fed a diet of reduced radioactive carbon animal feed. Cheeseburger 100 is prepared by cooking hamburger meat 108 from cattle which were fed radioactive carbon reduced animal feed. Also shown is bun 110 which is made from grain grown under radioactive carbon reduced carbon dioxide conditions. Also included is a piece of cheese 112 which was made from milk 102 having reduced radioactive carbon content. Finally, french fries 104 made from potatoes grown under radioactive carbon reduced carbon dioxide conditions which were fried in vegetable oil from vegetables also grown under radioactive carbon reduced carbon dioxide conditions.

Figure 10:
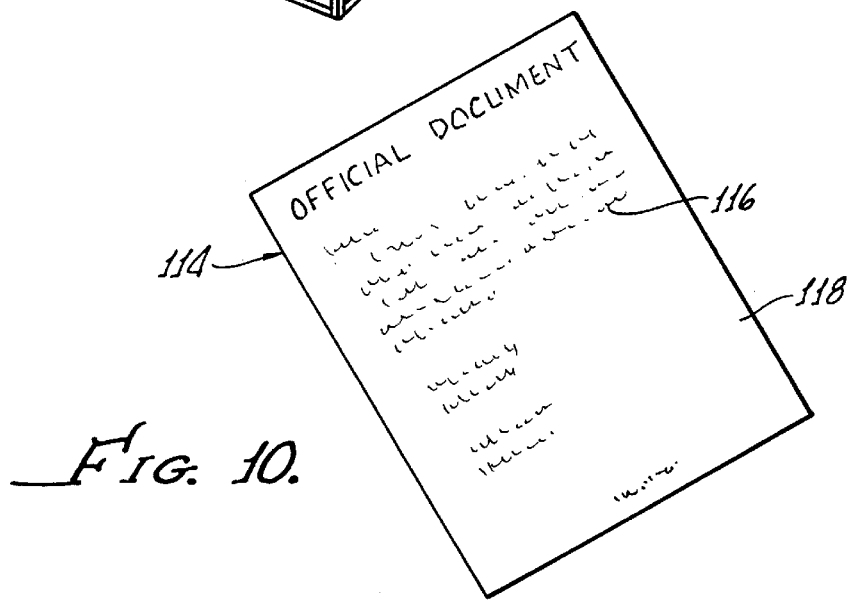
FIG. 10 illustrates a security document made from paper which is substantially free from carbon 14 according to the invention.

FIG. 10 shows a document 114 which consists of printing 116 on radioactive carbon reduced paper 118. Radioactive carbon reduced paper 118 was made from plants (not shown) grown under radioactive carbon reduced carbon dioxide conditions. Such documents can be verified by their unusually low content of radioactive carbon.

As mentioned earlier, once living tissue dies, its radioactive carbon 14 content decreases with time. This decrease in carbon 14 content occurs at a rate determined by its 6,500-year half-life. Because of this, fossil fuels such as coal, oil, gasoline etc., contain very little radioactive carbon 14. Also such sources as limestone contain very little radioactive carbon 14. If limestone is strongly heated in an electric furnace, carbon dioxide is given off according to the following chemical reaction:

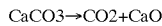

$$CaCO_3 \rightarrow CO_2 + CaO$$

The carbon dioxide released is virtually free from radioactive carbon 14. If this source of carbon dioxide is used as the sole source for growing plants, such plants will also be virtually free from radioactive carbon 14. In order to grow such plants which have a reduced concentration of radioactive carbon 14 atoms, the growing environment must be isolated from the outside carbon dioxide by such things as a greenhouse and biospheres. Carbon dioxide is then introduced into the system which is significantly lower in carbon 14 content than that found in ambient air. Outside air can be introduced into the system as long as the ambient carbon dioxide has been absorbed in a material such as potassium hydroxide and the like. Alternatively, the system can be sealed and fresh low carbon 14 content carbon dioxide continuously generated. The normal concentration of carbon dioxide in the air is quite low, only a few hundred parts per million. It may be desirable to either go above or below this level depending on the needs of the particular plants grown. The important thing to bear in mind is that the source of carbon dioxide used by the plants must be virtually free from radioactive carbon 14. It should also be noted that if a sealed greenhouse is used, the initial depletion of ambient carbon 14 containing carbon dioxide can be accomplished by growing plants from seeds and thus depleting the carbon 14 containing carbon dioxide in the form of plant matter that is to be later discarded.

Summarizing the present invention, a method for growing living plants having a lower carbon 14 content than those grown under ambient conditions preferably includes the steps of (1) removing ambient carbon dioxide from the air, (2) producing carbon dioxide which is lower in carbon 14 concentration than that which was removed from the air, (3) adding the lower carbon 14 concentration carbon dioxide back to the carbon dioxide depleted air, and (4) introducing the modified air into a greenhouse to grow plants having a reduced carbon 14 content compared to those grown under ambient conditions. The lower carbon 14 concentration carbon dioxide may be derived from limestone, preferably by thermally degrading limestone by reacting limestone with acid, or by combustion of fossil fuels.

In addition, a living plant according to the present invention having a lower than normal carbon 14 content is grown in a greenhouse in air that has been treated by the steps of (1) removing ambient carbon dioxide, (2) preparing carbon dioxide having a lower carbon 14 content than normally found under ambient conditions, and (3) adding the lower carbon 14 content carbon dioxide back into the depleted carbon dioxide air of step 1. Accordingly, edible food may be prepared from the low carbon 14 plants of the present invention. Also plant products such as paper may be prepared from the low carbon 14 plants. A living animal such as a cow having a lower than normal carbon 14 content may be raised from food derived from the low carbon 14 plants of the invention, and edible food may be prepared from the low carbon 14 animals.

Also according to the present invention, a greenhouse may be modified to have a low profile in order to cover a large growing area at a relatively low cost. Further, the lower carbon 14 concentration carbon dioxide is preferably introduced as effervescent carbonated water.

Those skilled in the art will understand that the preceding exemplary embodiments of the present invention provide foundation for numerous alternatives and modifications. These other modifications are also within the scope of the laminating technology of the present invention. Accordingly, the present invention is not limited to that precisely shown and described herein but only to that outlined in the appended claims.

We claim:

1. A method for growing plants having a low carbon 14 content, the plants being grown in a greenhouse, the method comprising the steps of:

removing carbon dioxide from an air supply;

producing carbon dioxide which is lower in carbon 14 concentration than said removed carbon dioxide;

adding said produced carbon dioxide to said air supply; and introducing said modified air supply into the greenhouse.

2. The method of claim 1 wherein said produced carbon dioxide is produced from limestone.

3. The method of claim 1 wherein said producing step comprises the step of thermally degrading limestone.

4. The method of claim 1 wherein said producing step comprises the step of reacting limestone with acid.

5. The method of claim 1 wherein said producing step comprises the step of combusting fossil fuels.

6. A method for growing plants having a low carbon 14 content, the plants being grown in a greenhouse, the method comprising the steps of:

removing carbon dioxide from the greenhouse;

producing carbon dioxide which is lower in carbon 14 concentration than said removed carbon dioxide;

adding said produced carbon dioxide to a water supply; and introducing said water supply into the greenhouse.

7. The method of claim 6 wherein said modified water supply is effervescent carbonated water.

8. A method of controlling the environment in a greenhouse, comprising the steps of:

removing carbon dioxide from an air supply, said removed carbon dioxide having a carbon 14 concentration;

producing carbon dioxide which has a carbon 14 concentration lower than that of said removed carbon dioxide;

adding said produced carbon dioxide to said air supply to yield a modified air supply; and introducing said modified air supply into the greenhouse.

9. Apparatus for growing plants, comprising:

a ventilated structure having an inner space; and a system including a carbon dioxide generator for generating carbon dioxide with a low concentration of carbon 14, said system introducing said produced carbon dioxide into said inner space of said structure;

said system further including a canister for removing carbon dioxide from ambient air outside of said structure and for providing said carbon dioxide-removed air to said carbon dioxide generator.

10. The apparatus of claim 9 wherein said system produces carbon dioxide having at least 50% less carbon 14 than carbon dioxide of ambient air.

11. The apparatus of claim 9 wherein said system produces carbon dioxide having substantially no carbon 14.

12. A method of controlling the environment in a structure, the environment having carbon dioxide containing carbon 14, the method comprising the steps of:

reducing the level of ambient carbon dioxide in the environment;

introducing carbon dioxide with a low carbon 14 concentration to the environment in the structure;

removing carbon dioxide from ambient air outside of the structure; and providing said carbon dioxide-removed air to the environment in the structure.

13. The method of claim 12 further comprising the step of:

producing carbon dioxide with a low carbon 14 concentration.

14. The method of claim 13 wherein said producing step produces carbon dioxide with at least 50% less carbon 14 than carbon dioxide of ambient air.

15. The method of claim 13 wherein said producing step produces carbon dioxide with substantially no carbon 14.

16. The method of claim 12, wherein said reducing step comprises the step of growing plants in the structure to absorb carbon dioxide containing carbon 14 in the environment.

17. The method of claim 16 wherein said reducing step further comprises the step of:

discarding portions of said plants which absorbed carbon dioxide carbon 14 from the environment.

18. The method of claim 16 wherein said plants are of a type not intended for consumption.

* * * * *